United States Patent [19]

Drechsler et al.

[11] Patent Number: 4,613,751
[45] Date of Patent: Sep. 23, 1986

[54] CONVEYOR SYSTEM FOR DISC MAGAZINE HAVING AN IDENTIFIER DISC

[75] Inventors: Klaus D. Drechsler, Neustadt; Werner Heuer, Lehrte; Rainer Tiebel, Schulenburg, all of Fed. Rep. of Germany

[73] Assignee: Polygram GmbH, Hamburg, Fed. Rep. of Germany

[21] Appl. No.: 615,270

[22] Filed: May 30, 1984

[30] Foreign Application Priority Data

Jul. 27, 1983 [DE] Fed. Rep. of Germany ....... 3327121

[51] Int. Cl.⁴ .............................................. G06M 7/00
[52] U.S. Cl. ................................. 250/223 R; 414/754
[58] Field of Search ............... 250/223 R; 369/36, 43; 414/416, 417, 422, 433, 754; 198/395

[56] References Cited

U.S. PATENT DOCUMENTS 4,124,968 11/1978 Stevens et al. .................. 250/223 R
4,427,332 1/1984 Manriquez .......................... 414/416

OTHER PUBLICATIONS

"Digital-Audio-Platten Startklar" by Prof. Claus Reuber, Funk-Technik 37 (1982), vol. 12, pp. 502-504.

Primary Examiner—David C. Nelms
Assistant Examiner—Stephone Allen
Attorney, Agent, or Firm—Hill, Van Santen, Steadman & Simpson

[57] ABSTRACT

Strict care must be taken in the mass production of high packing density, disc-shaped information carriers such as represented, for example, by the manufacture of compact discs, that no mix-ups occur of workpieces having different informational content during the production sequence. Proceeding on the basis that disc magazines are employed for conveying the disc-shaped workpieces from work station to the next, it is proposed that the disc magazines have a processing sequence for the workpiece stack they contain which is rigidly defined for all work stations by means of fitting parts. Also, each workpiece stack and thus each disc magazine accepting a workpiece stack therein is accompanied by an identifier disc whose shape corresponds to the shape of a workpiece. The identifier disc thus assumes the initial position in the rigidly defined hierarchy of a workpiece stack within a disc magazine. This identifier disc is read first at an input side of a work station by means of a read unit before the working-off of the workpiece stack contained in the disc magazine is undertaken in the prescribed sequence.

8 Claims, 4 Drawing Figures

4,613,751

CONVEYOR SYSTEM FOR DISC MAGAZINE HAVING AN IDENTIFIER DISC

BACKGROUND OF THE INVENTION

The invention relates to a conveyor system for the implementation of mass-production, high packing density, disc-shaped information carriers, particularly digital, optically readable audion compact discs (CDs), by use of disc magazines that can be moved from work station to work station on conveyor trucks or conveyor belts.

Production of the compact disc (CD) wherein such a conveyor system is utilized is disclosed in the reference Funktechnik 37 (1982), No. 12, pages 502–504, particularly page 503, incorporated herein by reference. The information which is applied to such a CD in the form of a spiral track exhibits extremely small dimensions on the order of 1 μm in order to achieve a high information recording density on such a disc exhibiting a diameter of 12 cm. Since this information is imperceptible to normal eyes or to optical equipment normally employed in the work place, it must be guaranteed that disc-shaped workpieces having different information are kept apart with high reliability during the course of manufacture, since a faultless production sequence could not be maintained otherwise.

SUMMARY OF THE INVENTION

An object of the invention is to design a conveyor system of the type initially cited for the mass-production of disc-shaped, high packing density information carriers such that lots whose disc-shaped workpieces exhibit different informational content also remain reliably separated from one another given simultaneous presence in the manufacturing sequence, that is without the production sequence being retarded.

This object is achieved by providing a disc magazine with parallel side walls and parallel guide grooves therein for receiving disc-shaped workpieces. At an initial position within the workpiece magazine an identifier disc is provided having an identifier zone or region with a pattern of alternating light-transmissive and light-non-transmissive portions. A read unit is provided having light beams associated therewith for detecting whether or not the identifier disc is at the initial position in the magazine so as to maintain a given sequence of workpieces when they are unloaded at work stations and then reloaded.

The invention proceeds from the observation that a clear separation between different lots can be guaranteed when each lot is divided over a plurality of disc magazines, and the workpieces respectively allocated to a disc magazine remain allocated in a given sequence beginning from the work station manufacturing the disc blanks all the way to the automatic packer for the finished discs. The rigid sequence hierarchy of a workpiece stack can be maintained with high reliability across all work stations in an extremely simple manner without additional techniques and without retarding the production sequence. According to the invention, a respective identifier disc is allocated to a workpiece stack in each disc magazine.

The identifier disc disposed in an initial position in the workpiece stack of a disc magazine is preferably interrogated at an input side of a work station by means of a read device.

DESCRIPTION OF THE PREFERRED EMBODIMENTS

Figure 1:
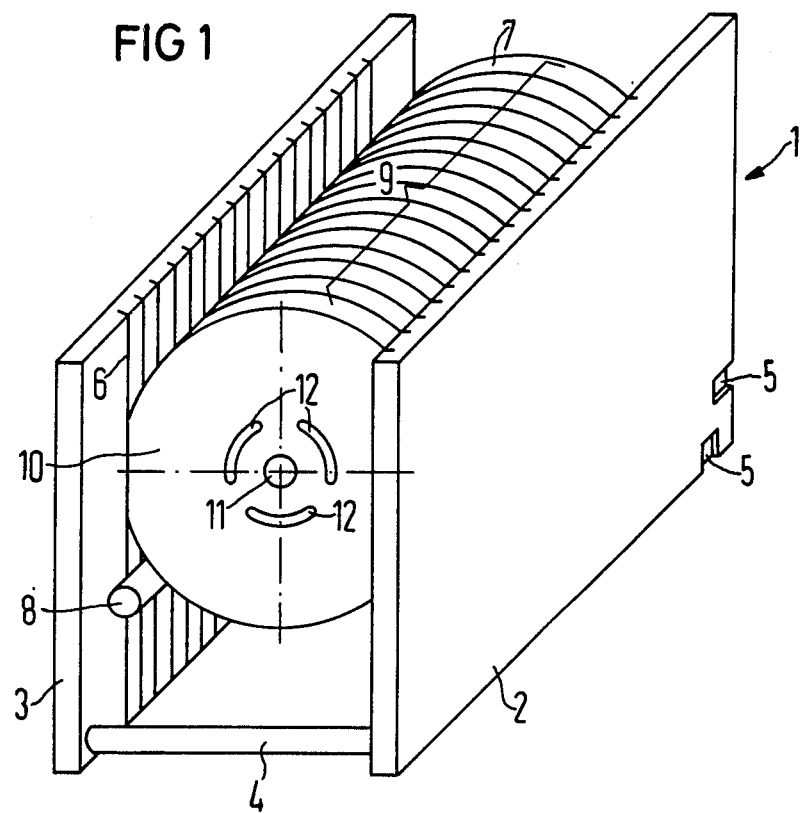
FIG. 1 is a perspective view of a disc magazine.

The disc magazine 1 is comprised of two rectangular wall parts 2 and 3 that are disposed parallel to one another at a distance corresponding to a diameter of a disc-shaped workpiece. The long edges of the wall parts represent the upper side and under side, and short edges represent the front side and back side of the disc magazine. The lower long sides of the wall parts 2 and 3 are fixed relative to one another near the edges via pin-like spacers 4. Furthermore, every wall part near the lower long sides in the proximity of the back side and the back side of the magazine formed by the wall parts have recesses 5 for the engagement of a peg that is provided in the region of the input side of a work station. These recesses insure that the disc magazine 1 has the prescribed alignment in a horizontal, oblique or vertical position for the removal of the workpieces.

At their mutually opposite inside surfaces, the wall parts 2 and 3 have guide grooves 6 parallel to the short side edges, the disc-shaped workpieces being introduced into the guide grooves 6 from the top. The workpieces thus run up against a stop 8 which is disposed on the inside of the wall parts 2 and 3 in a lower region perpendicular to the guide grooves 6. The stop 8 has the form of a round rod in the preferred embodiment.

The disc-shaped workpieces 7 forming a workpiece stack 9 overall are augmented by the identifier disc 10 whose dimensions are matched to those of the workpieces and which assumes the initial position in the sequence prescribed by the disc magazine. Like the other disc-shaped workpieces, the identifier disc 10 exhibits a concentric bore 11 and essentially differs from the workpieces 7 on the basis of three oblong holes 12 disposed on a concentric circle. These oblong holes serve to identify the identifier disc by means of a read device upon commencement of the removal of the workpiece stack 9 of a disc magazine at a work station.

Figure 2:
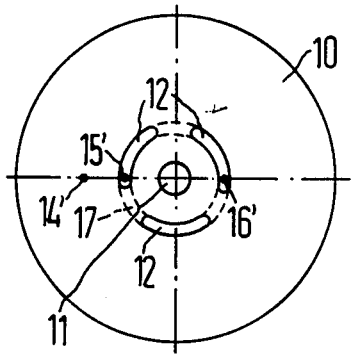
FIG. 2 is a plan view of an identifier disc.
Figure 3:
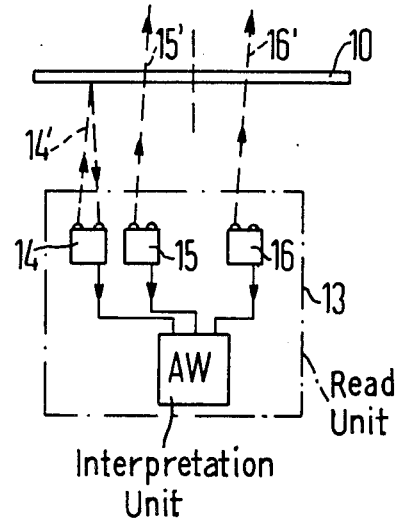
FIG. 3 is a schematic illustration of a read unit for an identifier disc according to FIG. 2.

The read unit and its function shall now be explained in greater detail with reference to FIGS. 2 and 3. FIG. 2 again shows the identifier disc 10 with the central bore 11 and the oblong holes 12. The read unit 13 is disposed perpendicularly below the identifier disc 10, as shown in FIG. 3. It comprises three reflectively functioning light units 14, 15, and 16 that are connected at their output side to an interpretation unit AW. The light units 14, 15, and 16 are disposed next to one another on a line parallel to a diameter line of the identifier disc 10. The light units 15 and 16 are symmetrically disposed with respect to the rotational axis of the identifier disc 10 at a distance from such rotational axis that is defined by the spacing of the oblong holes 12 from the rotational axis of the identifier disc 10. The further light unit 14 is at a greater distance from the rotational axis.

The light units 14, 15, and 16 respectively comprise a light transmitter and a light receiver in the form of a light-emitting diode and a photodiode. The identifier disc 10 in turn exhibits a reflective surface which, apart from the central bore 11, is only interrupted by the oblong holes 12. The oblong holes 12—which are disposed in common in a concentric ring zone 17—are dimensioned such that at least one light ray or beam of one of the light transmitters of the light units 15 and 16 lies in a region of and passes through an oblong hole 12 regardless of the rotational position of the identifier disc. Given the rotational position of the identifier disc 10 that is shown in FIG. 2, the light rays 15' and 16' of the light units 15 and 16 are located in the region of two oblong holes 12, so that these light units here function to detect a reflection, are not "closed", that is they don't detect a reflection. The light ray 14' of the light barrier 14 is reflected at the reflective surface of the identifier disc 10 and returns to the light receiver. The light unit 14 thus receives a reflected ray and detects the same and thus is "closed", whereas the light units 15 and 16 are "open". Depending on whether the light units are opened or closed, the interpretation unit AW now evaluates the identifier disc 10. An identifier disc is always present when the light unit 14 is closed and at least one of the light units 15 or 16 are open. Neither an identifier disc nor a workpiece is present when none of the light units are closed. The read unit 13 can also be employed for checking as to the presence or non-presence of a disc-shaped workpiece upon consideration of the fact that, independently of whether the workpieces are already provided with a reflective surface or not, the response sensitivity of the light units is dimensioned such that the light units close even given an only partial reflection of the light rays at the information layer. This means that a workpiece to be processed is present when all three light units 14, 15, and 16 indicate a closed condition. If no workpiece or identifier is present, then all three light units will be open.

Figure 4:
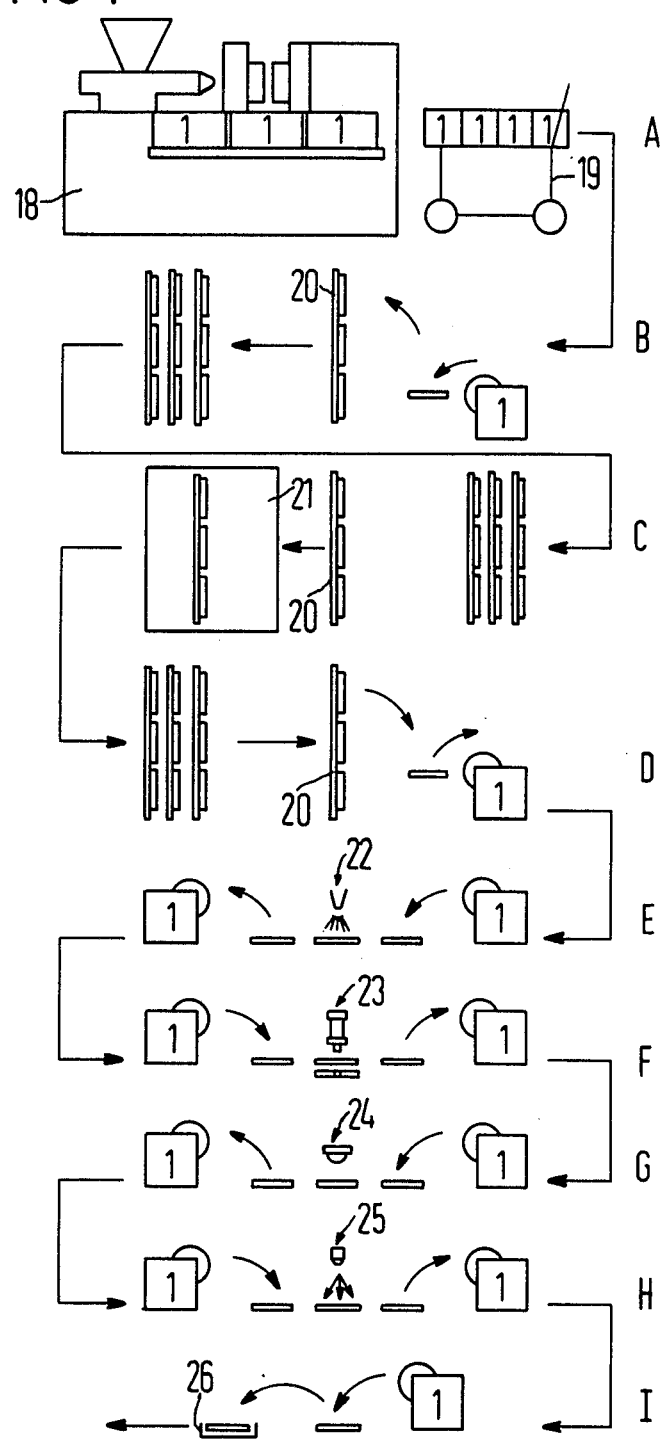
FIG. 4 is a schematic illustration of a production sequence for the manufacture of a CD.

Given the production sequence for the mass-production of CD's shown in FIG. 4, the conveyor system must connect nine work stations to one another. The disc magazines 1 filled with the disc blanks by the transfer mounding machine 18 at the work station A are loaded onto conveyor trucks 19 and are combined here into lots with workpieces having the same informational content. Each disc magazine additionally receives an identifier disc at the initial position of the workpiece stack to be accommodated therein.

From the work station A, the disc magazines are brought on the conveyor truck 19 to the work station B where the magazines are automatically unloaded in succession in the proper alignment and are placed on substrate plates 20. The substrate plates 20 loaded with the disc-shaped workpieces are then automatically moved to the work station C, are introduced into a sputtering installation 21 in which the workpieces are provided with a reflective metal layer on the side bearing the impressed information. The substrate plates 20 are then moved with the disc-shaped workpieces from the sputtering installation 21 to the work station D where the substrate plates are automatically unloaded and the workpieces are again automatically placed in the disc magazines 1 in the prescribed sequence. Preferably, the identifier disc respectively representing the first disc is also carried through the sputtering installation on the substrate plates so that there is no discontinuity between the unloading of the disc magazines 1 at the work station B and the reloading of the disc magazines at the work station D.

From the work station D, the disc magazines 1 now proceed to the work station E where protective lacquering is undertaken by means of a lacquering apparatus 22. The transport of the workpieces through the work station E occurs on an air pillow conveyor belt. After the lacquer-protected workpieces have again been placed in the disc magazine 1 at the output side of the work station E in the prescribed sequence with the identifier disc in an initial position, the disc magazine is moved to the next work station F which represents a punch press 23 for the center hole. Transit through this work station again occurs by means of an air pillow conveyor belt. Here, too, the workpieces of the workpiece stack are automatically removed from the magazine in the prescribed sequence at the input side and are automatically re-inserted into a disc magazine 1 at the output side.

The work station F is followed by the work station G in which the label is printed on the lacquer-protected side of the workpieces with an ink printer 24. Transit through the labelling means partially occurs on an air pillow conveyor belt and partially on an articulated belt with acceptance positions. The last work station H serves for final inspection by means of an optical device. Transport of the finished CD's through this work station H again occurs by means of an air pillow conveyor belt. After the discs have passed final inspection and have been reinserted into the disc magazine 1 in the prescribed sequence, packaging of the discs is carried out in the last work station I, this again occurring automatically, whereby here too the disc again is removed from the disc magazine 1 into the packaging container 26 in the prescribed sequence.

Upon transit through the work stations B through I, the identifier disc is always checked at the beginning of the unloading of the disc magazine and further unloading of a disc magazine is only carried out when the identifier disc is present. It is also expedient to provide the disc magazines belonging to a lot within a respective companion card which contains the code number for the informational content of these workpieces.

Although various minor changes and modifications might be proposed by those skilled in the art, it will be understood that we wish to include within the claims of the patent warranted herein all such changes and modifications as reasonably come within out contribution to the art.

We claim as our invention:

1. In a conveyor system for mass-production of high packing density disc-shaped information carriers wherein a plurality of disc magazines are provided that can be each moved from work station to work station, wherein the improvement comprises:
    the disc magazines being box-shaped and open to receive discs and having parallel side walls with parallel guide grooves at inside surfaces of the side walls for receiving the disc-shaped information carriers as work pieces;
    each disc magazine having a stack of workpieces and an identifier disc having a shape corresponding to the workpieces at an initial position within the disc magazine; and
    read means at an input side of the work station receiving the disc magazine for interrogation to determine whether the identifier disc is at the initial position of the disc magazine.

2. A conveyor system according to claim 1 wherein the disc magazine comprises two parallel rectangular wall parts having a spacing therebetween substantially corresponding to a disc diameter of the workpieces; each wall part having long edges forming upper and under sides of the disc magazine and short edges forming front and back sides of the disc magazine; said inside guide grooves being mutually aligned and parallel to the short edges; spacing means for fixing the wall parts relative to one another at the long edges at the underside of the disc magazine; stop means for the disc-shaped workpieces as they are being introduced into the guide grooves from the upper side of the disc magazine so that they rest in the guide grooves at a predetermined position, said stop means being in the form of a rod at an inside of one of the wall parts perpendicular to the guide grooves.

3. A conveyor system according to claim 1 wherein the read means comprises three light units, each light unit comprising light beam generating means and light beam detecting means; said identifier disc having an identifier zone; one of the light units being positioned so that its light beam is outside the identifier zone and the other two light units being positioned such that their respective light beams are within the identifier zone.

4. A conveyor system according to claim 3 wherein the identifier disc identifier zone is in the form of a ring and at a circumference of the ring there are alternately shorter and longer sections of substantially differing light permeability; and the three light units being positioned so that the light beams are perpendicular to a plane major surface of the identifier disc and two of the light units have their beams striking substantially at said periphery; and the alternating shorter and longer sections being dimensioned and the two light beams being positioned such that at least one of the light beams can always pass substantially through one of the sections without being substantially reflected for detection by the corresponding light unit regardless of a rotational position of the identifier disc.

5. A conveyor system according to claim 4 wherein the identifier disc has a light-reflecting surface and only the longer sections of the ring are light-transmissive.

6. A conveyor system according to claim 4 wherein the longer sections of the ring comprise curved oblong holes.

7. A system for maintaining a sequence of disc-shaped information carrier workpieces in a production line having at least one work station where the workpieces are unloaded from a disc magazine for processing, comprising:

a disc magazine having parallel walls and internal guide grooves in each of the walls in pairs so as to receive a plurality of disc-like workpieces;

at an initial position in the disc magazine an identifier disc having a shape corresponding to the workpieces, and wherein the workpieces follow behind the identifier disc;

at the work station a read means for identifying whether the identifier disc is at the initial position in the disc magazine when the disc magazine arrives at the work station for unloading of the workpieces and processing at the work station;

said identifier disc having an identifier zone with portions which are light-transmissive and other portions which are not light-transmissive in a given pattern; and the read means having at least one light beam associated therewith cooperating with the light-transmissive pattern on the identifier disc so as to identify whether the identifier disc is at the initial position.

8. A system according to claim 7 wherein the read means has a first light unit for generating a first light beam positioned such that the light beam will always be reflected by either a workpiece or an identifier disc when the magazine is positioned adjacent the read means; and said read means having another light unit positioned so that its light beam strikes in a region of the light-transmissive pattern which, depending upon the reflection or non-reflection of the beam, identifies whether an identifier disc or workpiece is present.

* * * * *